United States Patent [19]

Grider

[11] Patent Number: 5,105,262

[45] Date of Patent: Apr. 14, 1992

[54] THICK FILM CIRCUIT HOUSING ASSEMBLY DESIGN

[75] Inventor: Duane M. Grider, Eagan, Minn.

[73] Assignee: Ford Motor Company, Dearborn, Mich.

[21] Appl. No.: 245,496

[22] Filed: Sep. 19, 1988

[51] Int. Cl.[5] ................... H01L 23/02; H01L 23/12
[52] U.S. Cl. ........................... 357/74; 357/79; 174/52.1
[58] Field of Search .............. 357/74, 75, 76, 79; 174/50.5, 52.1

[56] References Cited

U.S. PATENT DOCUMENTS

| | | | |
|---|---|---|---|
| 2,825,014 | 2/1958 | Willemse | 357/79 |
| 3,153,750 | 10/1964 | Ackerman | 357/74 |
| 3,382,419 | 5/1968 | Boyer et al. | 357/74 |
| 3,443,168 | 5/1969 | Camp et al. | 357/74 |
| 3,723,836 | 3/1973 | Shekerjian et al. | 357/75 |
| 3,784,726 | 1/1974 | Smith et al. | 357/75 |
| 3,808,471 | 4/1974 | Grandia | 357/76 |
| 4,249,034 | 2/1981 | Fichot et al. | 357/74 |
| 4,688,074 | 8/1987 | Iinuma | 357/79 |
| 4,830,979 | 5/1989 | Crowe et al. | 357/74 |

FOREIGN PATENT DOCUMENTS

| | | | |
|---|---|---|---|
| 3701310 | 7/1988 | Fed. Rep. of Germany | 357/79 |
| 56-29351 | 3/1981 | Japan | 357/74 |

Primary Examiner—Rolf Hille
Assistant Examiner—Hoanganh Le
Attorney, Agent, or Firm—Peter Abolins; Keith L. Zerschling

[57] ABSTRACT

A housing and a pressure seal structure for use with a thick film circuit having a pressure sensor and terminals includes a base plate below the thick film circuit, a top housing above the thick film circuit covering the pressure sensor and an intermediate rubber ring between the housing and the thick film circuit. A coupling force is applied between the base plate and the top housing to draw the two together and apply a sealing force to the rubber ring and establish a pressure seal at the rubber ring.

2 Claims, 4 Drawing Sheets

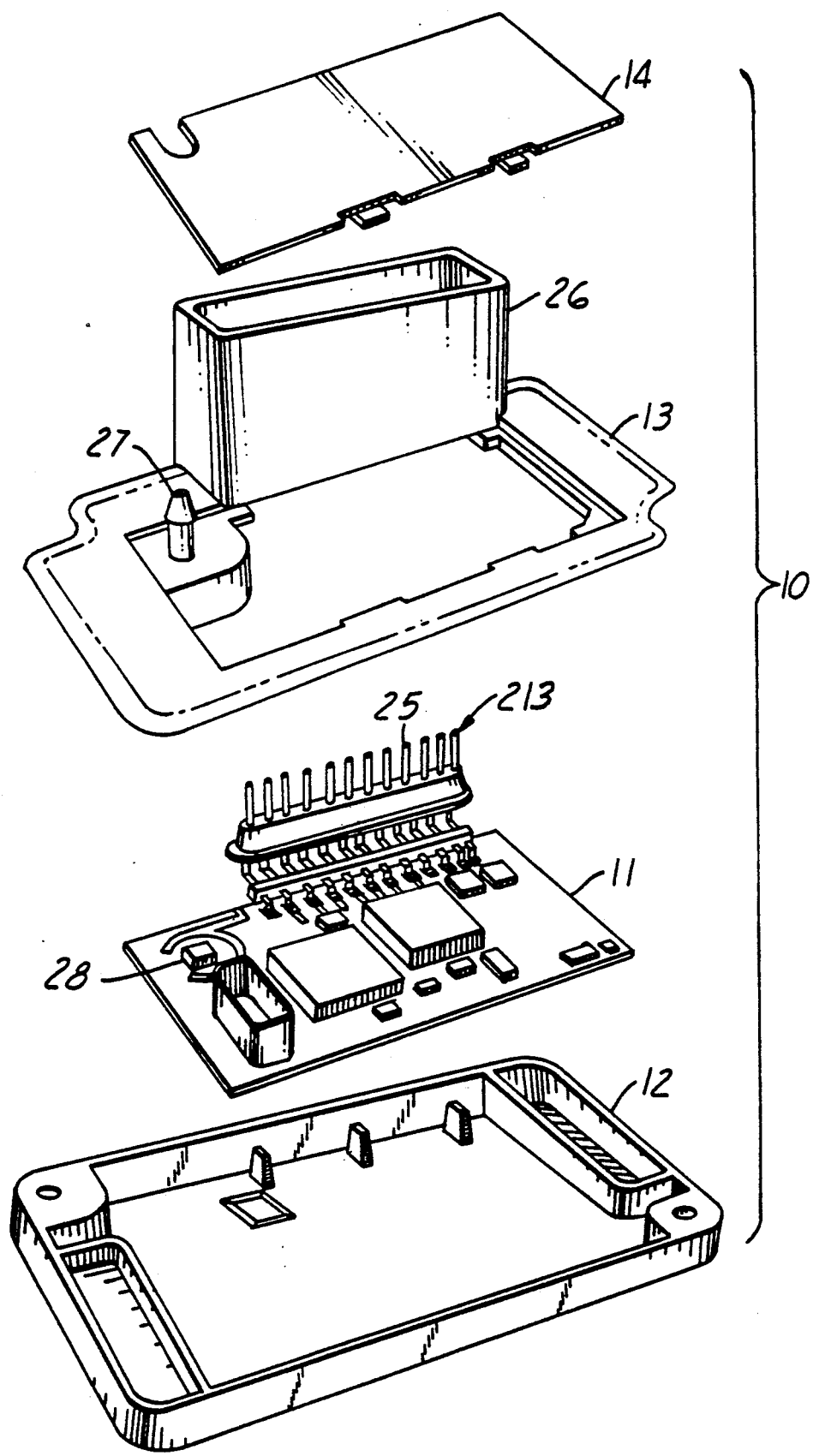

ABSTRACT

THICK FILM CIRCUIT HOUSING ASSEMBLY DESIGN

This patent application is related to patent application Ser. No. 07/245,495, now U.S. Pat. No. 4,952,529, entitled THICK FILM CIRCUIT TERMINAL ASSEMBLY DESIGN having the same inventor and assignee as herein.

FIELD OF THE INVENTION

This invention relates to thick film circuit assemblies.

BACKGROUND OF THE INVENTION

Thick film circuit assemblies may include numerous components which must be accurately positioned with respect to a thick film circuit board during manufacture. Manufacture may also require several separate sequential assembly actions that require intermediate repositioning of one or more pieces of the assembly. Each such assembly step requires time and allows for an error in assembly. It would be desirable to have a thick film circuit housing assembly design which facilitated proper alignment and assembly.

Thick film circuit boards may contain components, such as a pressure sensor, which require a housing to isolate the pressure to be measured from the ambient pressure. Such housings typically have had numerous structural components and seals to provide the desired pressure isolation.

Referring to prior art FIGS. 1 and 2, a housing assembly 10 includes a metal ring 11 which is printed on a thick film circuit board 12 and receives a flange 13 of a generally cylindrical housing 14, flange 13 being soldered to printed metal ring 11. A rubber gasket 15 is positioned in the upper opening of cylindrical housing 14 and a tube 16 is positioned in the center of gasket 15. Tube 16 is typically a polymer, and gasket 15 is typically a nitride rubber material. Housing 14 can be tin plated steel.

Manufacturing processes to fabricate such a structure typically include solder reflow and cleaning bath immersion. These processes reduce the adhesion of printed metal ring 11 to thick film circuit board 12. This is undesirable since reducing the adhesion may cause a pressure leak between ring 11 and thick film circuit board 12 and thereby cause sensor failure or reduce sensor accuracy. The adhesion is reduced because of heat retained in tin plated steel housing 14 for an extended period of time during solder reflow and during cleaning bath immersion operations.

It would be desirable to have a relatively simple and quickly assembled housing which provides a reliable pressure seal and easy assembly. These are some of the problems this invention overcomes.

SUMMARY OF THE INVENTION

Improved manufacturability is achieved by having a housing which can support the various components of a thick film circuit assembly during fabrication, and by reducing the number of parts in the assembly.

A housing structure for use with a thick film circuit board includes a housing for enclosing a Pressure sensor on the thick film circuit board and an intermediate rubber ring between the housing and the thick film circuit to provide a pressure seal. A coupling means applies a force between the housing and the thick film circuit to draw the two together and apply a sealing force to the rubber. For example, the coupling means can be a screw connector applying a force between a base plate below the thick film and a connector shell above said thick film.

BRIEF DESCRIPTION OF THE DRAWINGS

FIG. 3 is an exploded perspective view of a thick film circuit assembly in accordance with an embodiment of this invention;

DETAILED DESCRIPTION OF THE INVENTION

Figure 1:
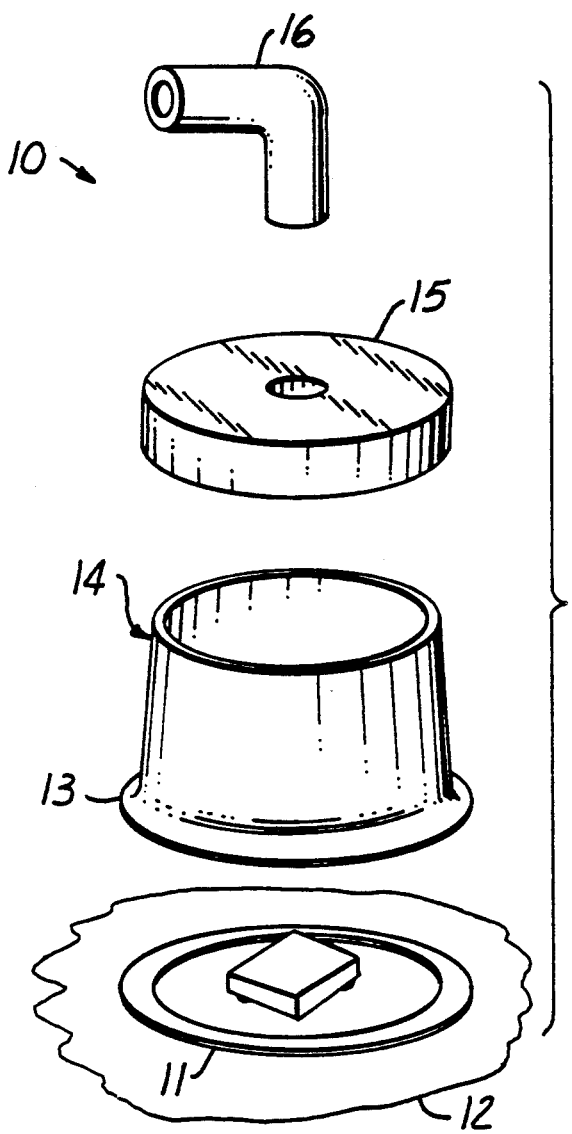
FIG. 1 is a exploded perspective view of a housing in accordance with the prior art.
Figure 2:
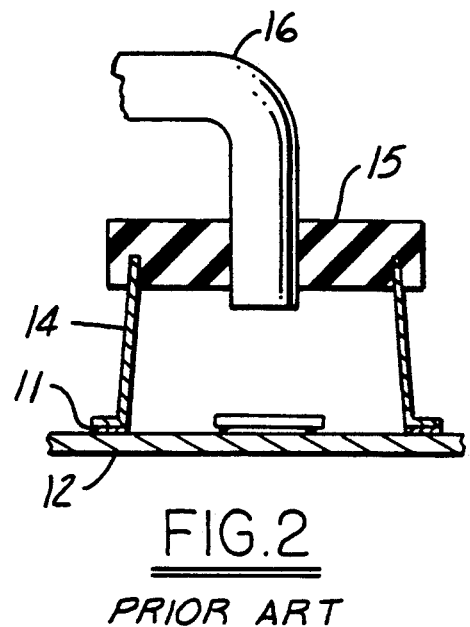
FIG. 2 is a section view of the assembled housing of FIG. 1 in accordance with the prior art.

Referring to FIG. 3, a thick film circuit assembly 10 includes a thick film circuit board 11 which is positioned in a bottom housing 12 and covered by a top housing 13 with an access panel 14. A terminal 213 has a plurality of electrical connectors 25 with associated legs 20 and angled feet 23, and is coupled to thick film circuit board 11 at angled feet 23. A pressure sensor 28 and various other components are coupled to a circuit board 11.

Figure 11:
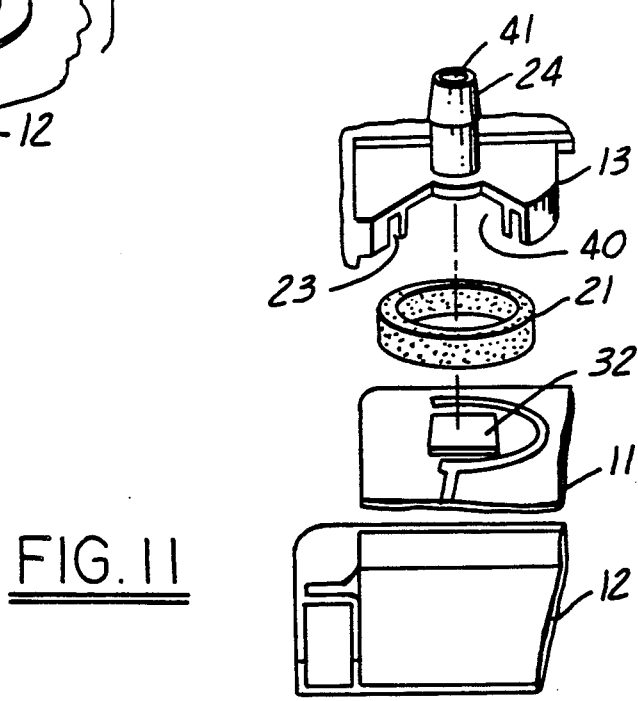
FIG. 11 is an exploded perspective view of a pressure housing assembly in accordance with an embodiment of this invention.
Figure 4:
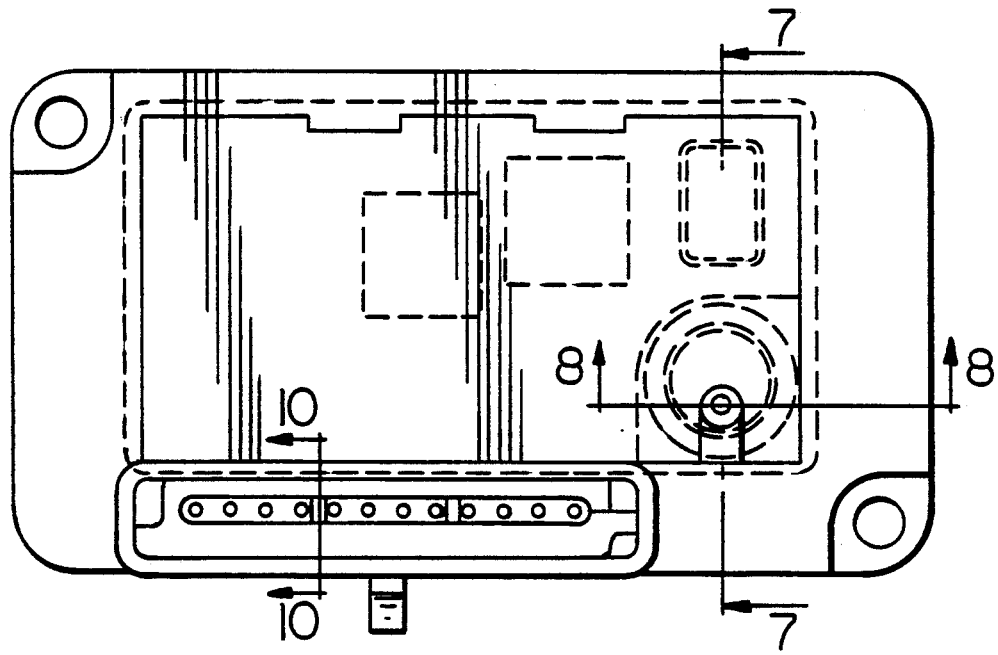
FIG. 4 is a plan view of a thick film circuit assembly in accordance with an embodiment of this invention.
Figure 5:
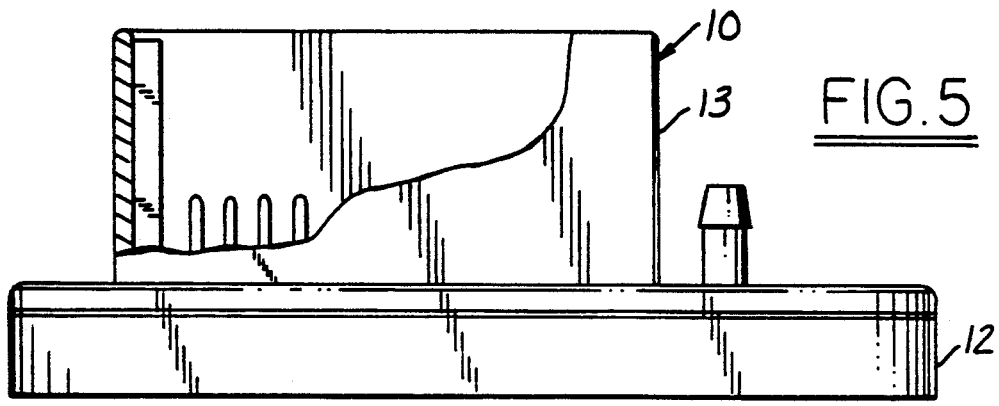
FIG. 5 is a side view, partly broken away, of the assembly of FIG. 4.
Figure 8:
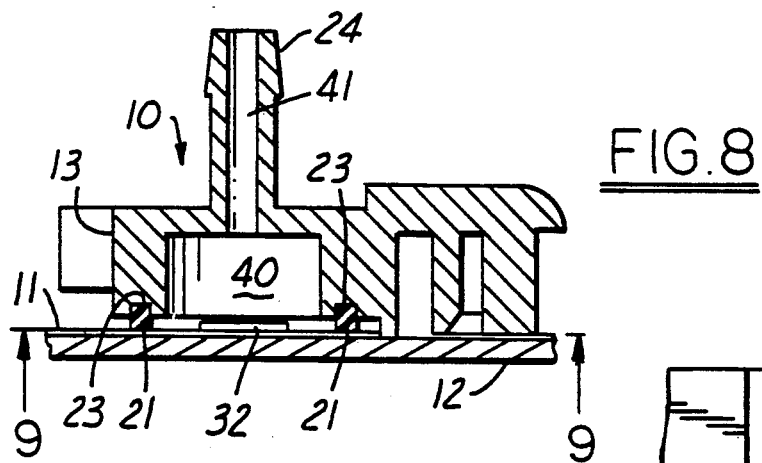
FIG. 8 is a section view along section 8—8 of FIG. 4.
Figure 9:
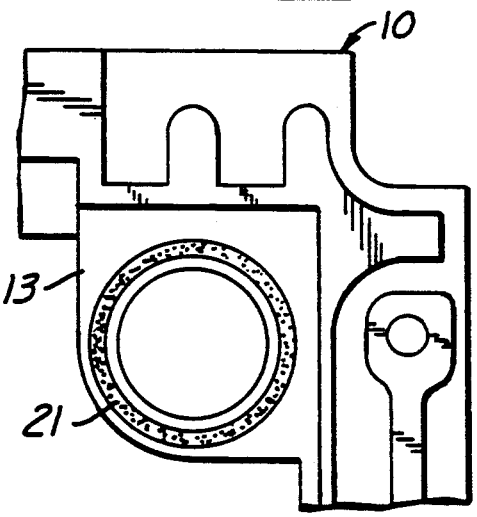
FIG. 9 is a section view along line 9—9 of FIG. 8.

Referring to FIGS. 4 through 9, and particularly FIG. 8, thick film circuit assembly 10 includes a rubber ring 21 which is coupled between thick film circuit board 11 and top housing 13. Advantageously, top housing 13 is a one piece structure with a cavity 40 surrounded by a circular recess 23 for receiving a portion of rubber ring 21. Cavity 40 is coupled to an elongated inlet opening 41. The top portion of top housing 13 about inlet opening 41 is a nozzle 24 which can be coupled to a tube. A pressure sensor 32 is positioned on thick film circuit board 11 within cavity 40. FIG. 11 shows an exploded view of the housing assembly for pressure sensor 32.

Figure 6:
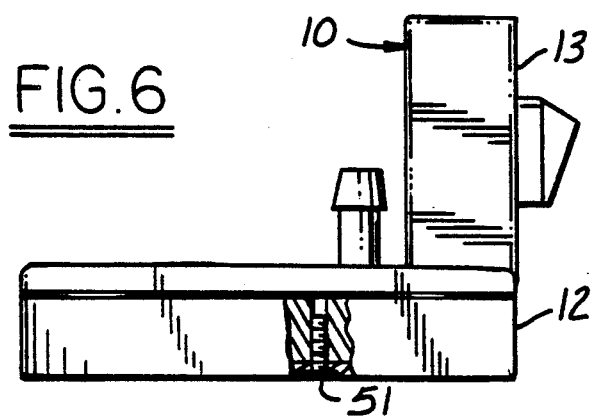
FIG. 6 is another side view of the assembly of FIG. 4, partly broken away, to show a connecting force application screw.
Figure 7:
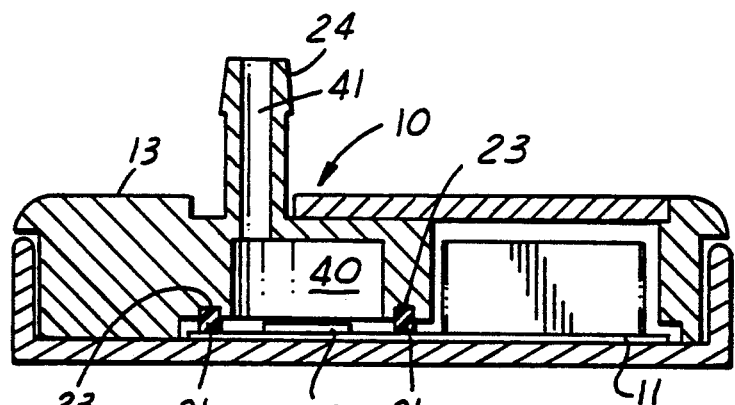
FIG. 7 is a section view along section 7—7 of FIG. 4.

To assemble thick film circuit assembly 10, a force is applied between thick film circuit board 11 and top housing 13 to compress and seal rubber ring 21. A typical way of applying such a force is to position thick film circuit board 11 on a bottom housing 12 and then to couple a force between bottom housing 12 and top housing 13. For example, a coupling force can be applied by a screw 51 as shown in FIG. 6. Accordingly, an enclosure for pressure sensor 32 is provided by a relatively simple structure which both provides the housing and the pressure seal required for the operation of pressure sensor 32.

Figure 10:
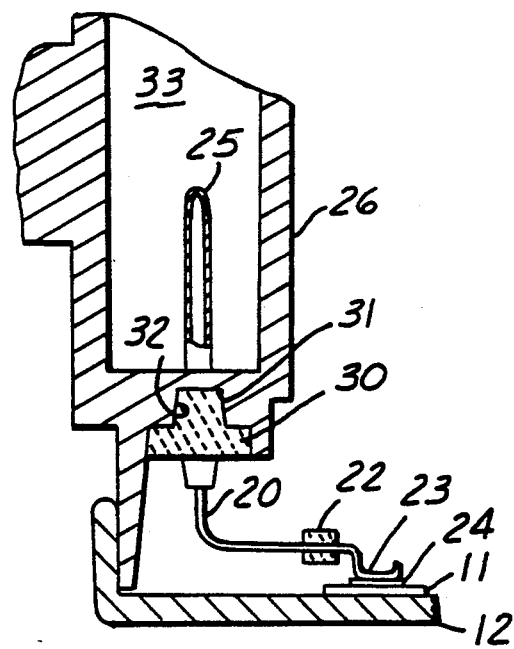
FIG. 10 is a view along section 10—10 of FIG. 4.

FIG. 10 shows how an elongated guide bar 30, connecting all the legs 20 of terminal 213, helps to position terminal 213 within a terminal support 26 of top housing 13. Guide bar 30 has tapered sides 31 which are received by a tapering opening 32 of terminal support 26. As a result, electrical connectors 25 are accurately centered within an opening 33 (in communication with opening 32) in terminal support 26. This self-centering effect provides for correct alignment of terminal 213 and improved ease of coupling another electrical connector to terminal 213.

The structure of the components of thick film circuit assembly 10 facilitates rapid and accurate assembly. During assembly, top housing 13 is positioned so that cavity 40 faces upward. Rubber ring 21 is dropped into circular recess 23. Thick film circuit board 11 is then dropped into top housing 13 so that pressure sensor 32 enters cavity 40 and terminal 213 enters terminal support 26. Top housing 13 has a recessed edge to receive and align thick film board 11. As terminal 213 enters terminal support 26, the tapered sides of guide bar 30 engage tapering opening 32 of terminal support 26 and align terminal 213. Bottom housing 12 is then positioned On the combination of top housing 13 and thick film board 11. Screw 51 is inserted to couple bottom housing 12 to top housing 13 thereby securing thick film circuit assembly 10 and establishing a pressure seal at rubber ring 21.

Various modifications and variations will no doubt occur to those skilled in the art to which this invention pertains. For example, the particular shape of the housing and relative component sizes may be varied from that disclosed herein. These and all other such variations which basically rely on the teachings through which this disclosure has advanced the art are properly considered in the scope of this invention.

I claim:

1. A housing structure assembly for use with a thick film circuit board having a pressure sensor and an electrical terminal includes:
   a closed path sealing member surrounding said pressure sensor and resting on said thick film circuit board;
   a housing means for providing a pressure barrier around said pressure sensor with said thick film circuit board, said housing means abutting said sealing member;
   a coupling means extending between said thick film circuit board and said housing means to apply a force there between thereby compressing said sealing member and providing a pressure seal between said housing means and said thick film circuit board;
   wherein said coupling means includes a base plate upon which is mounted said thick film circuit board and a connector means coupled between said housing means and said base plate so that a force applied between said base plate and said housing means compresses said sealing member between said thick film circuit board and said housing means; an
   a tapered guide bar coupled to said electrical terminal and a tapered opening in said housing means for receiving said guide bar thus positioning nd aligning said electrical terminal.

2. A housing structure assembly for use with a thick film circuit board having a pressure sensor and an electrical terminal including:
   a closed path sealing member surrounding said pressure sensor and resting on said thick film circuit board:
   a housing means having a pressure cavity for providing a pressure barrier around said pressure sensor with said thick film circuit board and for aligning an electrical terminal, said housing means abutting the surface of said sealing member and including a nozzle means in communication with said pressure cavity for providing an opening through said housing means, and said housing means further including a tapered opening for receiving said electrical terminal;
   a coupling means extending between said thick film circuit board and said housing means to apply a force there between thereby compressing said sealing member and providing a pressure seal between said housing means and said thick film circuit board;
   said coupling means including a base plate upon which is mounted said thick film circuit board and a connector means coupled between said housing means and said base plate so that a force applied between said base plate and said housing means applies a force between said housing means and said thick film circuit board and compresses said sealing member; and
   a tapered guide bar coupled to said terminals and sized smaller than said tapered opening in said housing means so that said tapered opening receives said tapered guide bar and positions and aligns said electrical terminal.

* * * * *